(12) United States Patent
Nishida (10) Patent No.: US 8,648,794 B2
(45) Date of Patent: Feb. 11, 2014

(54) SCREEN LIGHT COMPUTATION DEVICE OR METHOD

(75) Inventor: Yasuhiro Nishida, Ishikawa (JP)

(73) Assignee: Elzo Nanao Corporation, Ishikawa (JP)

( * ) Notice: Subject to any disclaimer, the term of this patent is extended or adjusted under 35 U.S.C. 154(b) by 0 days.

(21) Appl. No.: 13/877,026

(22) PCT Filed: Jun. 6, 2011

(86) PCT No.: PCT/JP2011/062894
§ 371 (c)(1),
(2), (4) Date: Mar. 29, 2013

(87) PCT Pub. No.: WO2012/046471
PCT Pub. Date: Apr. 12, 2012

(65) Prior Publication Data
US 2013/0194169 A1 Aug. 1, 2013

(30) Foreign Application Priority Data

Oct. 6, 2010 (JP) ................................. 2010-226400
May 15, 2012 (JP) ................................. 2012-111969

(51) Int. Cl.
*G09G 3/36* (2006.01)
*G09G 5/02* (2006.01)

(52) U.S. Cl.
USPC ......................................... 345/102; 345/589

(58) Field of Classification Search
USPC ......................................................... 345/102
See application file for complete search history.

(56) References Cited

U.S. PATENT DOCUMENTS

2009/0295708 A1  12/2009  Yamashita et al.

FOREIGN PATENT DOCUMENTS

| EP | 2131349 A1 | 12/2009 | |
|---|---|---|---|
| JP | 02-116703 A | 5/1990 | |
| JP | 04-353746 A | 12/1992 | |
| JP | 2004-117062 A | 4/2004 | |
| JP | 2004-170102 * | 6/2004 | ........... G01N 21/958 |
| JP | 2004-170102 A | 6/2004 | |
| JP | 2005-208548 A | 8/2005 | |
| JP | 2007-193355 A | 8/2007 | |
| JP | 2008-268339 A | 11/2008 | |

OTHER PUBLICATIONS

International Search Report dated Jul. 5, 2012, as issued in corresponding International Patent Application No. PCT/JP2011-062894, filed Jun. 6, 2011 (with English translation-2 pages).
Japanese Office Action dated Nov. 5, 2012, as issued in corresponding Japanese Patent Application No. 2012-111969, filed Oct. 26, 2012 (with English translation-7 pages).
Extended European Search Report mailed Jul. 23, 2013, issued in corresponding Application No. EP 11830405.4.

* cited by examiner

*Primary Examiner* — Charles V Hicks
(74) *Attorney, Agent, or Firm* — Maier & Maier, PLLC (57) ABSTRACT

In a screen light computation device, a first polarizing filter (93) blocks P waves reflected by a reflective surface, and screen light; the reflected light sensor (95) receives S waves; a second polarizing filter (83) allows the screen light to pass while blocking the S waves; and a screen light sensor (85), being set at Brewster's angle, where the P waves is not received, still receives some leakage P waves. A screen light extraction computation (LUT; not shown) stores a correlation between the detection value by the reflected light sensor 95 and the detection value by the screen light sensor 85. The LUT is queried, a value of only the screen light that does not include reflected light is computed, and the screen light that does not include ambient light (reflected light) reflected in a display screen of the monitor is detected without turning off a backlight of a monitor.

14 Claims, 6 Drawing Sheets

FIG. 1A

100: DETECTION DEVICE
101: COLD-CATHODE TUBE
103: POLARIZING FILTER
105: DETECTOR
107: BEZEL
108: LIQUID CRYSTAL PANEL
111: SCREEN LIGHT
121: PERIPHERAL LIGHT
122: REFLECTED LIGHT
123: MEASUREMENT POINT

FIG. 1B

124: SCREEN LIGHT MEASUREMENT IMAGE DISPLAY REGION

FIG. 2

83: SECOND POLARIZING FILTER
93: FIRST POLARIZING FILTER
85: SCREEN LIGHT SENSOR
95: REFLECTED LIGHT SENSOR
103: POLARIZING FILTER
105: DETECTOR
108: LIQUID CRYSTAL PANEL

FIG. 3A

|  | SCREEN LIGHT | S WAVE | P WAVE |
|---|---|---|---|
| SCREEN LIGHT SENSOR 85 | ○ | ✕ (SECOND POLARIZING FILTER) | ✕ (BREWSTER'S ANGLE) |
| REFLECTED LIGHT SENSOR 95 | ✕ (FIRST POLARIZING FILTER) | ○ | ✕ (FIRST POLARIZING FILTER) |

FIG. 3B

|  | SCREEN LIGHT | S WAVE | P WAVE |
|---|---|---|---|
| SCREEN LIGHT SENSOR 85 | ○ | ○ | ✕ (BREWSTER'S ANGLE) |
| REFLECTED LIGHT SENSOR 95 | ✕ (FIRST POLARIZING FILTER) | ○ | ✕ (FIRST POLARIZING FILTER) |

171: SWING ARM

SCREEN LIGHT COMPUTATION DEVICE OR METHOD

RELATED APPLICATIONS

This application is the U.S. national stage application which claims priority under 35U.S.C. §371 to International Patent Application No.: PCT/JP2011/062894, filed on Jun. 6, 2011, which claims priority under 35 U.S.C. §119, to Japanese Patent Application No.: 2010-226400, filed Oct. 6, 2010, and Japanese Patent Application No.: 2012-111969, filed May 15, 2012, the disclosures of which are incorporated by reference herein their entireties.

TECHNICAL FIELD

The invention relates to a detection device that separately detects linearly polarized light emitted from a screen of an image display device (hereinafter referred to as "monitor") and ambient light reflected by a display screen of a monitor, and more specifically, relates to a detection process with a backlight of the monitor on.

BACKGROUND ART

Gamma correction is needed to deal with luminance change or the like caused by age deterioration of a liquid crystal panel, a backlight, or the like of a monitor.

Patent Document 1 discloses a light measurement device with a swing arm. The light measurement device is moved to a position in front of a liquid crystal display device when measuring light, and is rotatably moved into a bezel when the light measurement is finished. Gamma correction is performed on the basis of the obtained screen light.

PRIOR ART REFERENCE

Patent Document

Patent Document 1: JP-A-2007-193355

SUMMARY OF THE INVENTION

Problems to be Solved by the Invention

In the above Patent Document 1, a measurement unit is configured to move to a specific position on the screen. Consequently, there have been problems of a complex structure due to the above movable configuration. Also, the device of Patent Document 1 is influenced by the reflected light, and thereby disadvantageously incapable of accurately performing gamma correction. In order to eliminate the influence of the reflected light, a total value of linearly polarized light (hereinafter referred to as "screen light") emitted from a screen of the monitor and ambient light (hereinafter referred to as "reflected light") reflected by the display screen of the monitor are computed after the measurement unit is swung to a position. Then, a backlight of the monitor is turned off to detect only the reflected light, and the difference between both values is obtained to enable accurate gamma correction that is not influenced by the above reflected light.

However, in the above method, the backlight needs to be turned off under the usage environment in order to separately detect light.

The present invention is made in view of solving the above problems, and the objective of the present invention is to provide a screen light computation device and a method capable of detecting screen light without turning off a backlight of a monitor under a usage environment.

Means for Solving the Problems (1) A screen light computation device according to the present invention includes: A) a screen light detection sensor that is positioned to face, at a predetermined angle, a display screen of a monitor, which emits screen light linearly polarized in a first direction, the screen light detection sensor detecting the screen light; B) a reflected light detection sensor that has a light-receiving surface provided on a plane substantially same with a plane of a light-receiving surface of the screen light detection sensor, the reflected light detection sensor detecting ambient light reflected by the display screen of the monitor; C) a first polarizing filter that is provided on a front side of the reflected light detection sensor, the first polarizing filter having a polarizing direction perpendicular to the polarizing direction of the screen light which has been linearly-polarized; and D) a computation means for computing a value of the screen light included in a detection value by the screen light detection sensor on the basis of both the detection value by the reflected light detection sensor and the detection value by the screen light detection sensor.

The first polarizing filter has the polarizing direction perpendicular to the polarizing direction of the screen light which has been linearly-polarized, and the first polarizing filter blocks the screen light and blocks P waves or S waves having the polarizing direction in parallel with the screen light. Consequently, the above light does not reach the reflected light detection sensor. The screen light detection sensor receives the S waves and the P waves in addition to the screen light. The reflected light detection sensor receives the P waves or the S waves having the polarizing direction perpendicular to the polarizing direction of the screen light. The computation means computes screen light value included in the detection value by the screen light detection sensor on the basis of both the detection value by the reflected light detection sensor and the detection value by the screen light detection sensor. As a result, it is possible to obtain the detection value of the screen light without turning off the backlight of the monitor.

(2) In the screen light computation device according to the present invention, a second polarizing filter is provided on a front side of the screen light detection sensor, and the second polarizing filter has the polarizing direction perpendicular to the polarizing direction of the first polarizing filter. Consequently, the second polarizing filter allows the screen light to pass therethrough, and blocks the P waves or the S waves that have a polarizing direction perpendicular to the polarizing direction of the screen light. Consequently, it is possible to detect the screen light, under an environment having a large reflected light intensity, even with a sensor having a narrow dynamic range.

(3) In the screen light computation device according to the present invention, the first polarizing filter has a polarizing direction perpendicular to the first direction, and is provided at a position for blocking P waves. Due to the above, the reflected light detection sensor receives the S waves. As a result, it is possible to compute a screen light value included in the detection value by the screen light detection sensor on the basis of both the detection value of the S waves and the detection value by the screen light detection sensor.

(4) In the screen light computation device according to the present invention, the first polarizing filter has a polarizing direction perpendicular to the first direction, and is provided at a position for blocking S waves. Due to the above, the reflected light detection sensor receives the P waves. As a result, it is possible to compute a screen light value included in the detection value by the screen light detection sensor on the basis of both the detection value of the P waves and the detection value by the screen light detection sensor.

(5) In the screen light computation device according to the present invention, the predetermined angle corresponds to Brewster's angle formed by the light-receiving surface of the sensor and the display screen of the monitor. Consequently, the screen light detection sensor does not receive the P waves. As a result, it is possible to correspondingly reduce a light quantity of the reflected light detected by the screen light detection sensor. Due to the above, it is possible to detect the screen light, under an environment having a large reflected light intensity, even with a sensor having a narrow dynamic range.

(6) In the screen light computation device according to the present invention, the screen light detection sensor and the reflected light detection sensor are swingably attached to the monitor to switch between a position within space in front of an image display region on the monitor and another position retracted from the front space. Consequently, in the swing-arm detection mechanism, it is possible to detect the screen light with the backlight on.

(7) A gamma correction processing device according to the present invention includes a gamma correction means for performing gamma correction of the monitor on the basis of the screen light computed by the screen light computation device. Consequently, it is possible to perform gamma correction of the monitor.

(8) A method for computing screen light according to the present invention includes steps of: providing a screen light detection sensor, at a predetermined angle, to face a display screen of a monitor, which emits screen light linearly polarized in a first direction, the screen light detection sensor detecting the screen light; providing a reflected light detection sensor that has a light-receiving surface provided on a plane substantially same with a plane of a light-receiving surface of the screen light detection sensor, the reflected light detection sensor detecting ambient light reflected by the display screen of the monitor; providing a first polarizing filter that is provided on a front side of the reflected light detection sensor, the first polarizing filter having a polarizing direction perpendicular to the polarizing direction of the screen light which has been linearly-polarized; and computing a value of the screen light included in a detection value by the screen light detection sensor on the basis of both the detection value by the reflected light detection sensor and the detection value by the screen light detection sensor.

The first polarizing filter blocks the screen light and the reflected light (S waves or P waves), which has a polarizing direction in parallel with the polarizing direction of the screen light, and thereby the reflected light (S waves or P waves) does not reach the reflected light detection sensor. As a result, the reflected light detection sensor receives the reflected light (S waves or P waves) having the polarizing direction perpendicular to the first direction. The screen light detection sensor receives the reflected light (S waves and P waves) in addition to the screen light. A screen light value included in the detection value by the screen light detection sensor is computed on the basis of both the detection value by the reflected light detection sensor and the detection value by the screen light detection sensor. Due to the above, it is possible to obtain the detection value of the screen light without turning off the backlight of the monitor.

(9) A screen light computation device according to the present invention includes a screen light detection sensor that is provided to form Brewster's angle relative to a display screen of a monitor, which emits screen light linearly polarized in a first direction, the screen light detection sensor detecting the screen light; and a polarizing filter that is provided on a front side of the screen light detection sensor, the polarizing filter having a polarizing direction in parallel with the polarizing direction of the screen light which has been polarized, the screen light detection sensor being provided at a position, at which the polarizing filter blocks S waves and allows the screen light linearly polarized in the first direction to pass therethrough.

Due to the above configuration, the P waves is not reflected by the display screen of the monitor because of Brewster's angle, and the S waves is blocked by the polarizing filter. As a result, the P waves and the S waves both do not reach the screen light detection sensor, and thereby only the screen light reaches the screen light detection sensor. Consequently, it is possible to obtain the detection value of the screen light without turning off the backlight of the monitor.

(10) In a monitor according to the present invention, the monitor is mounted with the screen light computation device according to any one of the items (1) to (5), or (9), wherein: the screen light detection sensor and the reflected light detection sensor are provided within a frame member located around an image display region on the monitor to face the image display region. Due to the above, the screen light computation device is capable of detecting the screen light without covering the display screen.

Note that, in the present specification, "P waves" correspond to polarized light of the reflected light, which has a vibration plane of an electric field vector included in an incident plane that includes the normal and incident beam of the reflective surface. "S waves" correspond to polarized light having a vibration plane perpendicular to the incident plane. "Screen light" is not supposed to include reflected light. A "frame member" corresponds to a bezel 107 in the embodiments. "Front space of an image display region" corresponds to space defined by displacing the image display region in parallel with itself in a direction, in which the screen light is emitted. For example, the front space has 20-inch size for the case of the display region having 20-inch size.

A "light-receiving surface provided on a plane substantially same with a plane" corresponds to a case, where the light-receiving surface of the reflected light detection sensor and the light-receiving surface of the screen light detection sensor are included in the same plane, and also corresponds to another case, where a plane including the light-receiving surface of the reflected light detection sensor is parallel with a plane including the light-receiving surface of the screen light detection sensor.

Figure 4:
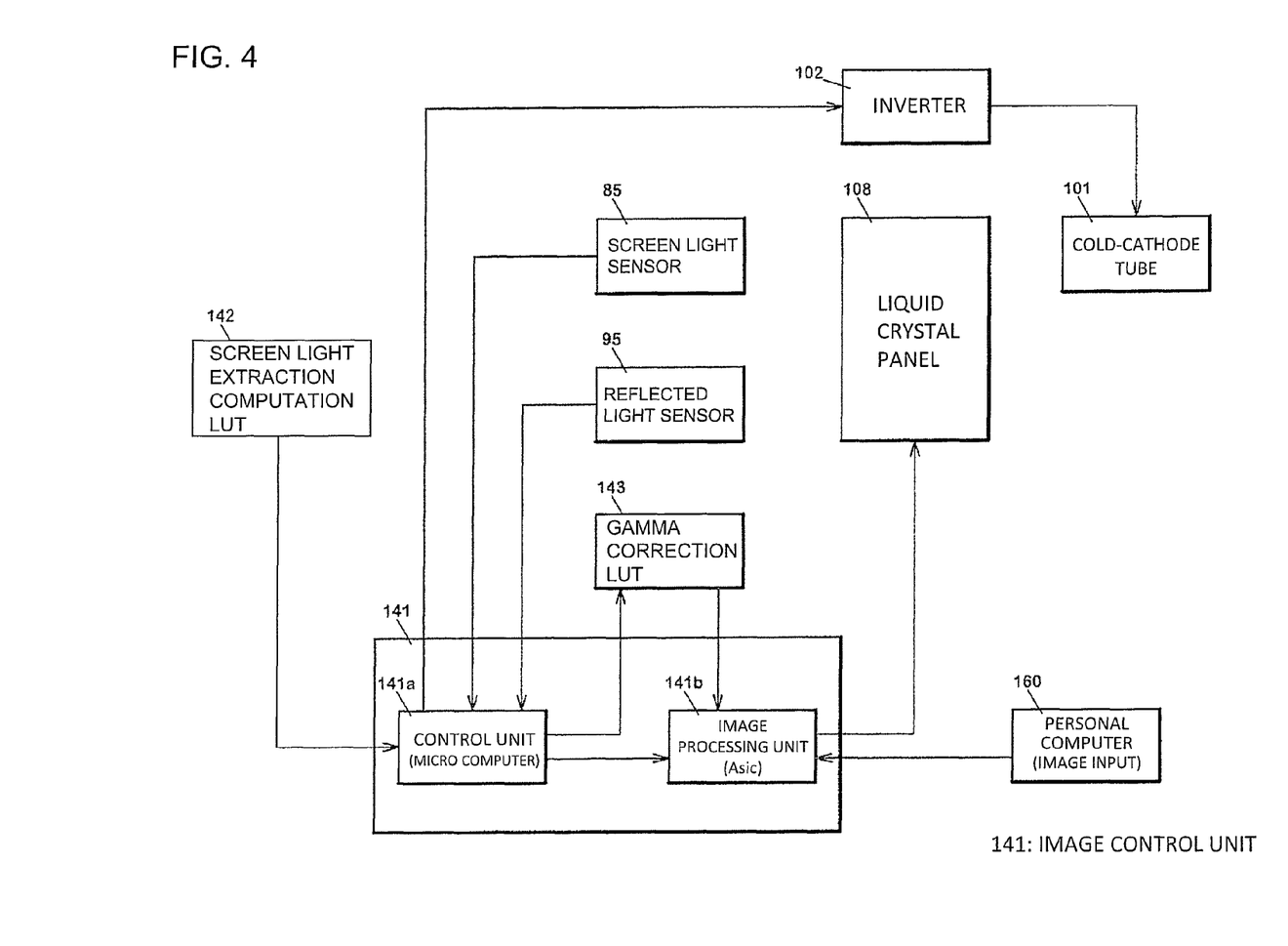
FIG. 4 is a block diagram illustrating a configuration of a monitor according to the present embodiment.

The screen light computation device according to the present invention corresponds to a screen light detection sensor 85, a reflected light detection sensor 95, a screen light extraction computation LUT 142, and a control unit 141a shown in FIG. 4 in the embodiment.

BRIEF DESCRIPTION OF THE DRAWINGS

FIGS. 1A and 1B are diagrams each illustrating a position, at which a detection device 100 is attached. FIG. 1A is a main part cross sectional view, and FIG. 1B is a diagram viewed from a front side of a liquid crystal panel.

EMBODIMENT CARRYING OUT THE INVENTION

Embodiments of the present invention will be described below with reference to drawings.

(1. First Embodiment)

Figure 1A:
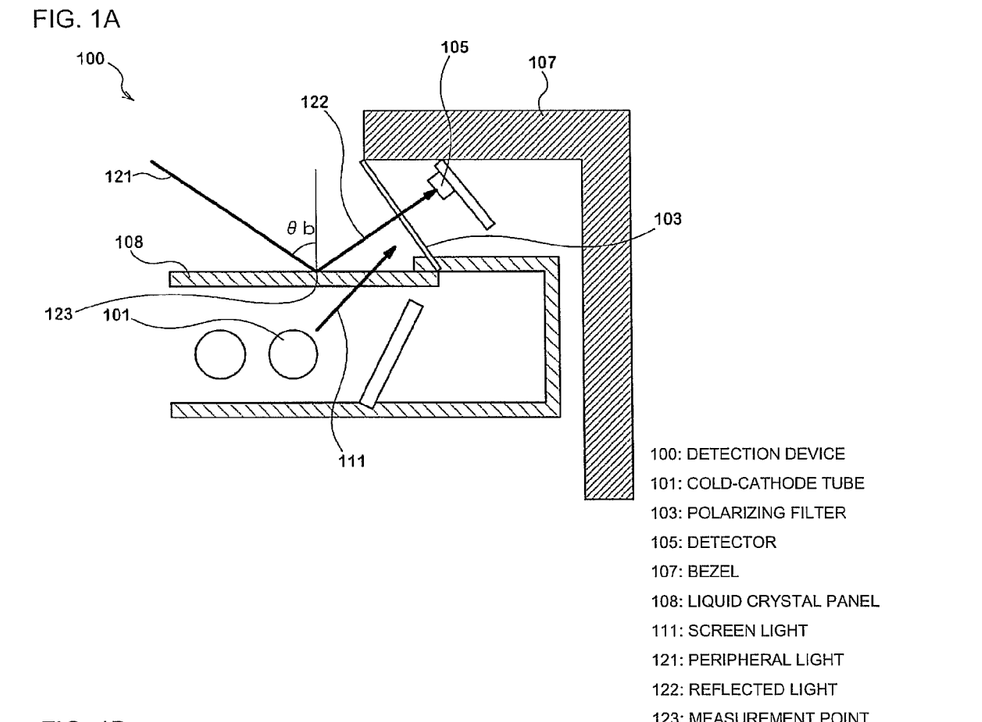

A detection device 100 has a detector 105 positioned to face a liquid crystal panel 108 with a predetermined angle within a bezel 107 that surrounds the liquid crystal panel 108 as shown in FIG. 1A. A polarizing filter 103 is provided between the detector 105 and the liquid crystal panel 108. The polarizing filter 103 is provided on a front side of the detector 105, and may closely contact the detector 105 or may alternatively be located away from the detector 105. The detector 105 detects transmitted light 111, which is light emitted from a cold-cathode tube 101 and passes through the liquid crystal panel 108, and the detector 105 detects light, which is reflected by the liquid crystal panel 108 and passes through the polarizing filter 103.

The detector 105 and the polarizing filter 103 will be described with reference to FIG. 2. Note that the detector 105 is configured so as to form, in fact, Brewster's angle θb relative to the liquid crystal panel 108 in FIG. 1A. However, in FIG. 2, in order to facilitate the understanding of a polarizing direction, the detector 105 is illustrated to form about 90 degrees.

The detector 105 has a screen light sensor 85, which serves as a screen light detection sensor, and a reflected light sensor 95, which serves as a reflected light detection sensor. The screen light sensor 85 and the reflected light sensor 95 are located adjacent to each other, and both of the sensors have light-receiving surfaces formed on the same plane. However, positions of both sensors are not limited to the above positional relation, and both sensors may be positioned parallel with each other. In other words, the light-receiving surface of the screen light sensor 85 may include the plane parallel with the plane of the light-receiving surface of the reflected light sensor 95. Also, in a case, where both sensors are formed on the same plane or positioned parallel with each other, both sensors may not be necessarily located adjacent to each other.

In a case, where the planes including the light-receiving surfaces are not the same, but are formed in parallel with and apart from each other, the difference of quantities of light received by both sensors becomes greater with the increase in the distance between the sensors. Therefore, the difference is desirably equal to or less than 5 mm. Note that in a case, where the sensors are located not on the same plane but in parallel with each other as above, correction should be performed, as required, by a degree equivalent to the difference in the light-receiving amount. The above is true for another case, where the sensors are not located adjacent to each other.

By using two filters (a first polarizing filter 93 and a second polarizing filter 83) in addition to the two sensors (the screen light sensor 85 and the reflected light sensor 95), it is possible to separately detect screen light emitted by the liquid crystal panel 108 and ambient light reflected by the liquid crystal panel 108.

Figure 2:
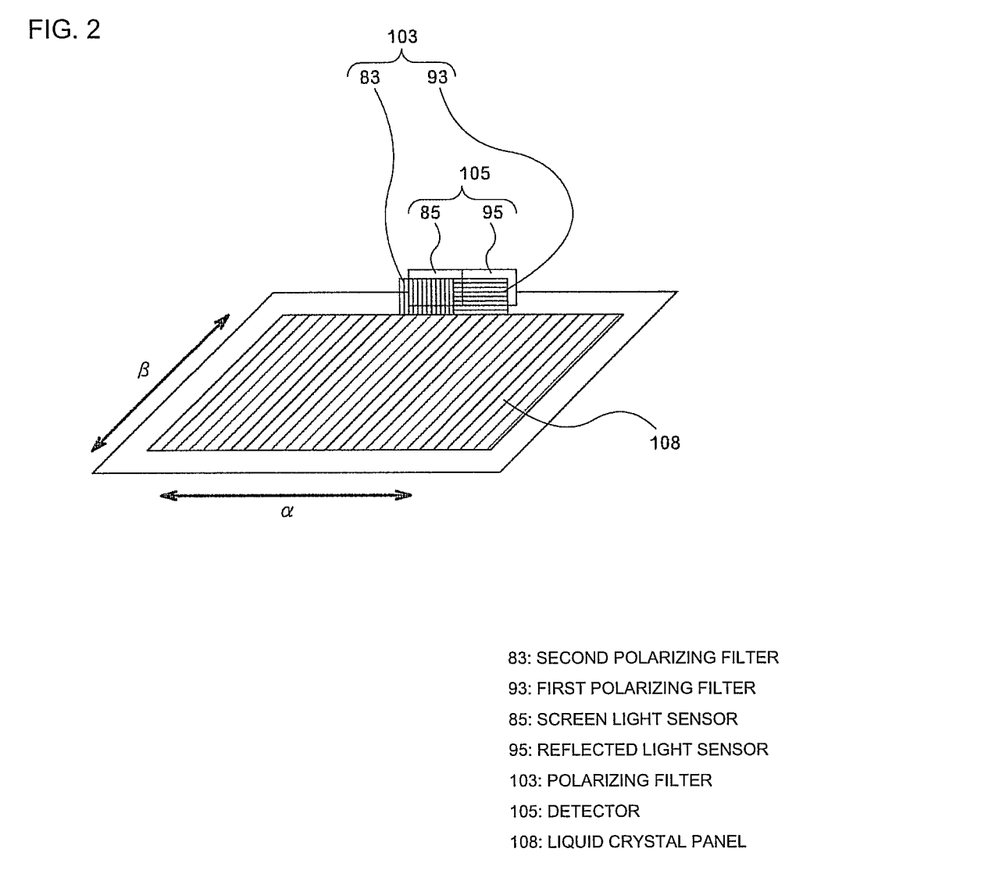
FIG. 2 is a diagram for explaining a polarization relation for screen light and emitted light at the detection device 100.

As shown in FIG. 2, the first polarizing filter 93 has a polarizing direction for allowing S waves, which are reflected by the liquid crystal panel 108, to pass therethrough. Note that the detector 105 is retracted within a bezel such that the light-receiving surface thereof receives the reflected light incident from a predetermined direction. The second polarizing filter 83 has the polarizing direction perpendicular to the polarizing direction of the first polarizing filter 93. Screen light linearly polarized in the first direction is emitted from the liquid crystal panel 108, and passes through the second polarizing filter 83 at a position, where both sensors are located (in FIG. 2, either on an upper side or a lower side of the liquid crystal panel 108).

Figure 3A:
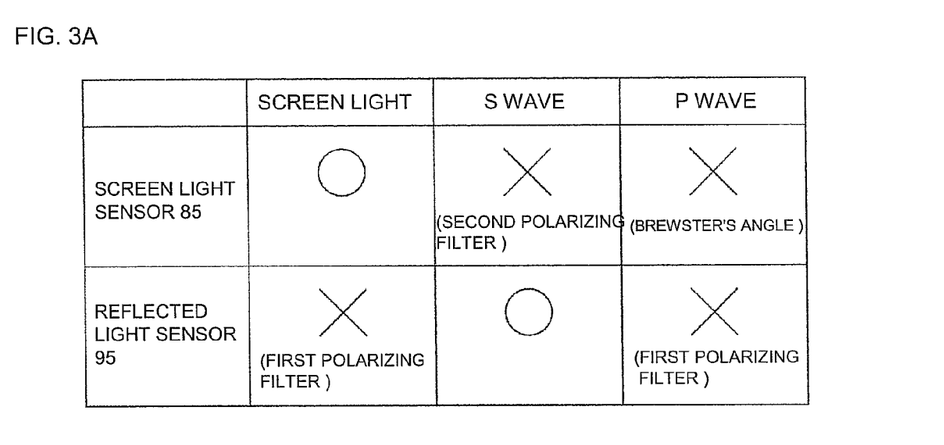
FIGS. 3A and 3B show light detected by sensors for the detection device 100.

Light detected by each sensor will be described with reference to FIG. 3A.

Firstly, the reflected light sensor 95 will be described. Ambient light is reflected by the liquid crystal panel 108. The S waves of the reflected light pass through the first polarizing filter 93. This is because the first polarizing filter 93 has the polarizing direction that allows the S waves reflected by the liquid crystal panel 108 to pass therethrough. In contrast, the P waves has the polarizing direction perpendicular to the polarizing direction of the S waves. Consequently, the P waves of the reflected light are blocked by the first polarizing filter 93.

Since screen light, which has passed through the liquid crystal panel 108, is blocked by the first polarizing filter 93, the screen light is not detected by the reflected light sensor 95. The reason for being blocked is described below. As described later, the second polarizing filter 83 has the polarizing direction perpendicular to the polarizing direction of the first polarizing filter 93. Also, the polarizing direction of the second polarizing filter 83 is the same with the polarizing direction of the emitted light from the liquid crystal panel 108. Thus, the polarizing direction of the screen light from the liquid crystal panel 108 is perpendicular to the polarizing direction of the first polarizing filter 93.

Next, the screen light sensor 85 will be described. Since the polarizing direction of the second polarizing filter 83 is the same with the polarizing direction of the screen light that passes through the liquid crystal panel 108, the screen light from the liquid crystal panel 108 passes through the second polarizing filter 83. In contrast, the S waves of the light reflected by the liquid crystal panel 108 are blocked by the second polarizing filter 83. The above is true since the polarizing direction of the second polarizing filter 83 is perpendicular to the polarizing direction of the first polarizing filter 93 that allows the S waves to pass therethrough. In addition, since the light-receiving surface of the detector 105 is provided to form Brewster's angle relative to the liquid crystal panel 108, the screen light sensor 85 does not receive the P waves of the reflected light.

Provision of the light-receiving surface of the detector 105 to form Brewster's angle relative to the liquid crystal panel 108 indicates that, as shown in FIG. 1A, the detector 105 is provided such that ambient light incident, at the Brewster's angle, at a measurement point 123 on the liquid crystal panel 108 is reflected by the measurement point 123, and the reflected light is received by the detector 105 so as to form an incident angle of 90 degrees relative to a detection surface at a center of the detector 105.

Figure 1B:
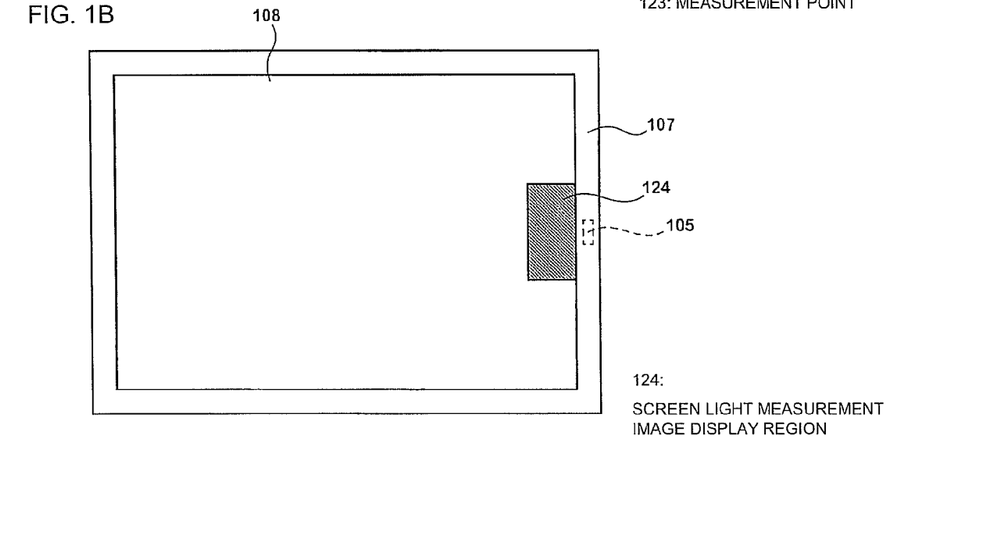

As shown in FIG. 1B, the measurement point 123 is set at any position on a display surface of the liquid crystal panel 108 within a screen light measurement image display region 124 for displaying a screen light measurement image used for gamma correction.

Note that, the screen light measurement image display region 124 is designed to have a width enough for achieving accuracy of measuring light by the detector 105. The screen light measurement image display region 124 may be set in any region on the display surface of the liquid crystal panel 108 provided that the detector 105 is capable of measuring light in the region. The screen light measurement image display region 124 is not limited to be set on a right side on the display surface of the liquid crystal panel 108 as shown in FIG. 1B.

As described above, in the present embodiment, the light-receiving surface of the reflected light sensor 95 has the first polarizing filter 93 with the polarizing direction that allows the S waves reflected by the liquid crystal panel 108 to pass therethrough, and the light-receiving surface of the screen light sensor 85 has the second polarizing filter 83 having the polarizing direction perpendicular to polarizing direction of the first polarizing filter 93. The light-receiving surfaces of both sensors are located at the position reached by the screen light, which is linearly polarized in the first direction and passes through the second polarizing filter 83. Also, the light-receiving surface of the screen light sensor 85 is configured to form Brewster's angle relative to the reflective surface of the liquid crystal panel 108. Due to the above, as shown in FIG. 3A, the screen light sensor 85 detects the screen light, and the reflected light sensor 95 detects the S waves of the reflected light.

In the present embodiment, the light-receiving surface of the screen light sensor 85 is provided to form Brewster's angle relative to the liquid crystal panel 108 in order to block the P waves otherwise received by the screen light sensor 85. However, in fact, it is found impossible to block all the P waves, for example, due to the deviation of the angle, by which the sensor is attached, or due to the scattering light caused by anti-glare finishing of the display surface even when the sensor has been attached to form Brewster's angle. Although the reason for the above is not clearly known, the inventor assumes that the above is caused, for example, by the deviation of the attachment angle, or by the scattering light caused by anti-glare finishing of the display surface.

In other words, the screen light sensor 85 inevitably detects thus leakage P waves. Consequently, the screen light sensor 85 detects partial P waves, and thereby the accuracy in the gamma correction is deteriorated.

It is possible to solve the above problems by the following method.

The value of the leakage P waves has a certain correlation with a detection value (luminance value) of the S waves detected by the reflected light sensor. Considering the above correlation, the relation of the both values are measured in advance by the shipping time, and thereby it is possible to obtain a corrected detection value (luminance value) of the screen light computed by removing the influence of the leakage P waves from the original detection value by the screen light sensor 85. The detection values may be measured with the backlight of the liquid crystal panel 108 off using the reflected light sensor 95 and the screen light sensor 85 while intensities of the reflected light are sequentially changed, and then the correlation between both sensors may be pre-stored, by the shipping time, in a screen light extraction computation lookup table (hereinafter referred to as a screen light extraction computation LUT), for example.

Note that, the above relation may be stored in a reference table form, or may be computed, as required, based on a pre-stored approximate calculation formula.

Due to the above, it is possible to obtain the detection value (luminance value) of only the screen light that does not include the detection value of the leakage P waves detected by the screen light sensor.

Once the value of the screen light that does not include the reflected light as above is known, it is possible to perform the gamma correction by using conventional methods, and also to improve the accuracy of the gamma correction.

FIG. 4 illustrates a configuration block diagram of a monitor having the above detection device 100. For example, it is possible to perform the gamma correction in the following manner. A gamma correction LUT 143 stores therein a table indicating an "input signal"-to-"output signal" relation used for converting input tone signals from a personal computer 160 into output tone signals to the liquid crystal panel 108. When a control unit 141a is given a command for gamma correction, the control unit 141a commands an image processing unit 141b to cause the liquid crystal panel 108 to display gamma correction test data with predetermined input tone signals in the screen light measurement image display region 124 on the display surface (see FIG. 1B).

The screen light sensor 85 and the reflected light sensor 95 detect the screen light from the screen light measurement image display region 124 (see FIG. 1B) and light reflected by the region. The control unit 141a refers to a screen light extraction computation LUT 142 to compute the screen light value (luminance value), which does not include the reflected light, based on the detection values (luminance values) of both sensors 85, 95. Furthermore, the control unit 141a commands the image processing unit 141b to change the tone of the test data, and measures the screen light with multiple tones so as to obtain correlation of "input tone signal" to "screen light (luminance)". The control unit 141a rewrites the gamma correction LUT 143 based on the obtained correlation so as to obtain the desired gamma characteristics.

Since the gamma correction LUT 143 is rewritten as above, it is possible to display the input image data, which is given by the personal computer 160, with accurate gamma-correction. Note that in the present embodiment, the screen light sensor 85 receives only the leakage P waves included in the reflected light. Consequently, it is possible to detect the screen light even with a sensor having a narrow dynamic range. Specifically, even when the amount of the reflected light relative to the screen light is large, it is possible to achieve highly accurate detection.

In addition, it is possible to separately detect the reflected light and the screen light even during the measurement with the backlight of the monitor on.

In the present invention, a screen light detecting sensor and a reflected light detecting sensor are provided on the same plane. Light is emitted into both sensors in the same direction, and the value of the reflected light is removed from the detection value by the screen light detecting sensor by referring to the detection value by the reflected light detecting sensor. Note that in a case, where the screen light detecting sensor and the reflected light detecting sensor are provided in parallel with each other, even when both sensors receive light, which is not incident thereon strictly in the same direction, it is still possible to remove the value of the reflected light from the detection value by the screen light detecting sensor to a certain degree by referring to the detection value by the reflected light detecting sensor. Thus, it is possible to improve the accuracy of gamma correction. Due to the above, it is possible to detect the screen light that does not include reflected light even with the screen light detecting sensor that is not attached precisely at the Brewster's angle.

In addition, by separately detecting the reflected light without turning off the backlight, it becomes possible to adjust the luminance, especially for the luminance of lower tone (black level), of the display screen, based on the luminance of the reflected light.

(2. Second Embodiment)

Figure 5:
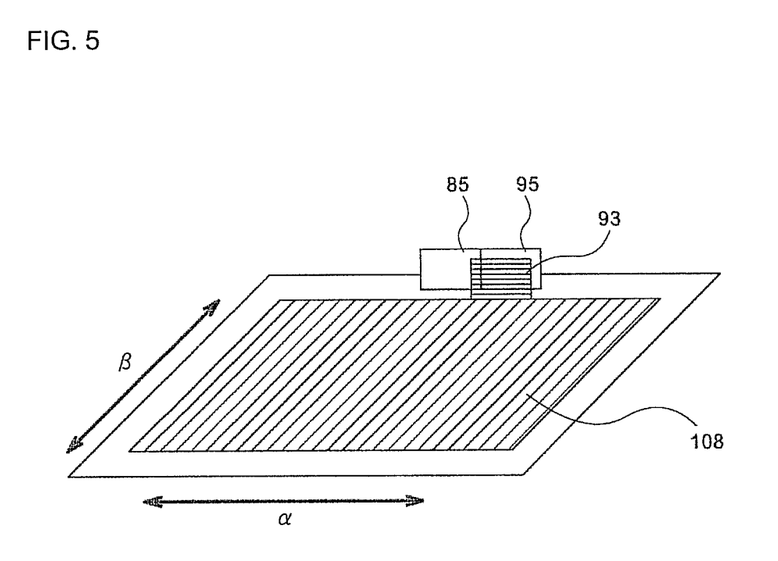
FIG. 5 is a diagram illustrating another embodiment.

In the above embodiment, two sensors and two polarizing filters are employed. As shown in FIG. 5, the polarizing filter for the screen light sensor 85 may be alternatively omitted.

Figure 3B:
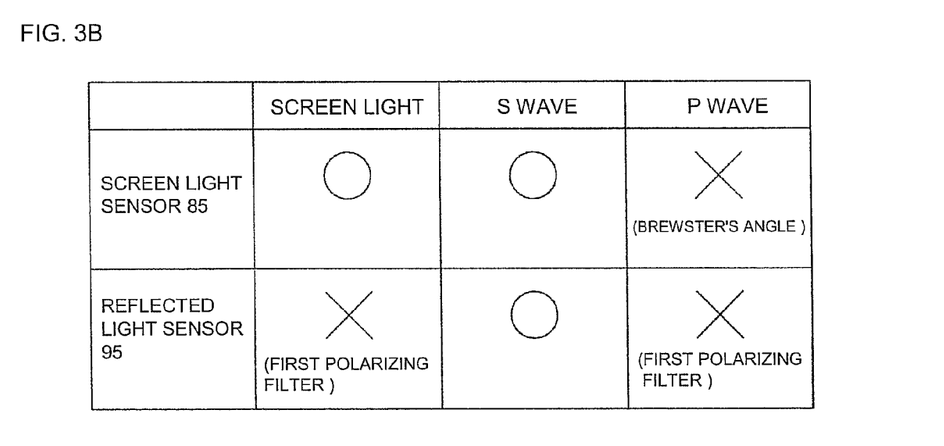

In the above case, the screen light sensor 85 receives the S waves and also the leakage P waves of the reflected light in addition to the screen light as shown in FIG. 3B.

In the above case, correlation between the detection value by the screen light sensor 85 and the detection value by the reflected light sensor 95 may also be stored in the screen light extraction computation LUT 142.

In the present embodiment, the screen light sensor 85 receives the reflected light, too. However, since the second polarizing filter is not required, it is possible to reduce the manufacturing cost for the trade-off.

Note that in the above first and second embodiments, the screen light sensor 85 may be alternatively provided so as not to form Brewster's angle relative to the reflective surface. In the above case, since the screen light sensor 85 receives the P waves, a correction value in the screen light extraction computation LUT 142 can be determined in consideration of the receipt of the P waves.

(3. Third Embodiment)

Each of the above embodiments describes a case, where the detector is provided within the upper bezel. However, the detector may be provided on the lower side. Alternatively, the detector may be provided either on a right side or a left side in a case, where the polarizing direction of the display screen is a transverse direction (horizontal) instead of the longitudinal direction. In other words, the position, at which the detector is provided, may be determined based on the polarizing direction of the display screen.

Figure 6:
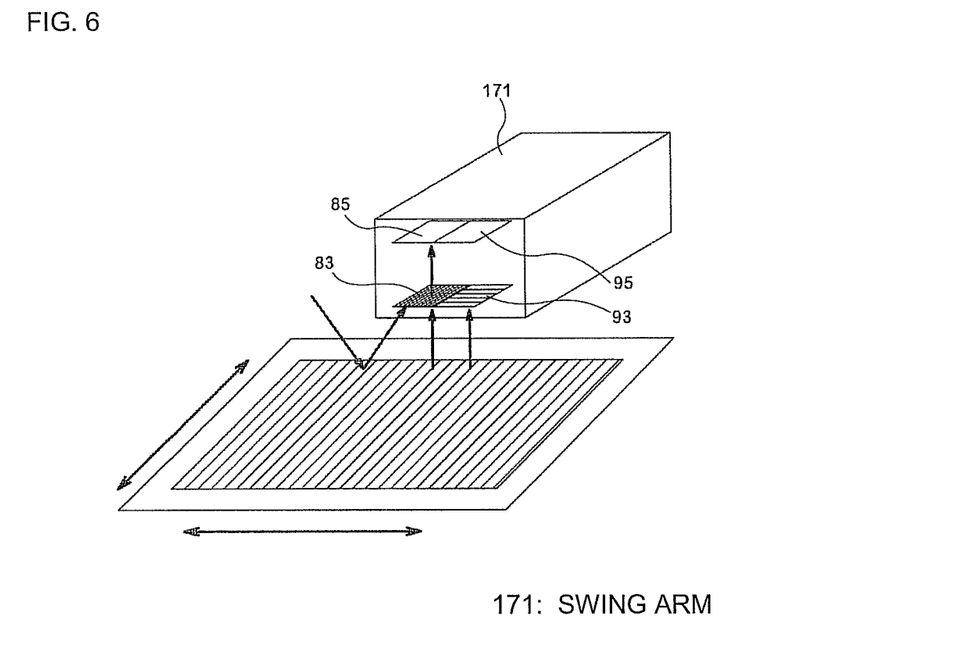
FIG. 6 is a diagram illustrating further another embodiment.

Furthermore, the present invention may be applied to a swing-arm-type detection mechanism shown in Patent Document 1. The application of the detector to the swing-arm is advantageous when the detector should be provided at the corner of the bezel to correspond to the inclined polarizing direction of the liquid crystal panel 108. Furthermore, the detector may be applicable to the swing-arm for a case, where the liquid crystal panel 108 has the polarizing direction in the longitudinal direction or the transverse direction (horizontal direction). FIG. 6 shows an application example. A swing arm 171 receives therein the screen light sensor 85, the reflected light sensor 95, the first polarizing filter 93, and the second polarizing filter 83. As above, by attaching the sensors and filters to the swing arm 171, it is possible to place the detector at a position within space in front of the image display region on the monitor during the detection. Also, it is possible to place the detector at another position retracted from the front space when the detector is not in use for detection.

In a case, where the present invention is applied to the swing-arm as above, the following advantages are achievable compared with the conventional swing-arm device. If the first polarizing filter 93 has the polarizing direction that allows the S waves of the reflected light to pass therethrough, the first polarizing filter 93 does not allow the screen light to pass therethrough, and allows only the S waves of the reflected light to pass therethrough. In addition, since the second polarizing filter 83 has the polarizing direction perpendicular to the polarizing direction of the first polarizing filter 93, the second polarizing filter 83 does not allow the S waves of the reflected light to pass therethrough, but allows the screen light and the P waves of the reflected light to pass therethrough. Consequently, by computing the value of only the screen light based on the detection values by the reflected light sensor 95 and the screen light sensor 85, it is possible to improve the degree of accuracy in the detection of the screen light.

In a case, where the first polarizing filter 93 has the polarizing direction that allows the P waves of the reflected light to pass therethrough, by making the second polarizing filter 83 allow the S waves of the reflected light to pass therethrough, it is possible to compute the value of only the screen light based on the detection values by the reflected light sensor 95 and the screen light sensor 85, similar to the above. Note that although the degree of accuracy in the detection of the screen light is slightly deteriorated, only the screen light sensor 85 and the second polarizing filter 83 may be provided in another embodiment within the swing arm 171 without the reflected light sensor 95 and the first polarizing filter 93. In the above case, since the second polarizing filter 83 does not allow part of the reflected light (S waves or P waves) to pass therethrough, it is possible to improve the degree of accuracy in the detection of the screen light.

(4. Other Embodiment)

The above first embodiment describes an example, where the reflected light sensor 95 receives the S waves, and the screen light sensor 85 receives the leakage P waves. Alternatively, the reflected light sensor 95 may be configured to receive the P waves, and the screen light sensor 85 may be configured to receive screen light and the S waves by shifting the polarizing direction by 90 degrees. Specifically, both sensors may be provided on a right side or a left side instead of the upper position as shown in FIG. 2, and the polarizing direction of both filters may be changed by 90 degrees.

The above is applicable to the second embodiment.

In each of the above embodiment, ambient light is measured based on light reflected on the display screen, instead of using a sensor provided to a part of the casing. By determining the illumination intensity of ambient light based on light actually reflected on the display screen, it is possible to highly accurately perform gamma correction.

Note that, gamma correction process may be performed by hardware or by software and CPU.

The above embodiment describes a case, where the cold-cathode tube is employed as the backlight. However, any types of the backlight may be employed. For example, white LEDs are deteriorated by ultraviolet rays. The same is true for RGB LEDs.

Furthermore, any monitor other than the liquid crystal monitor may be applicable provided that the monitor emits linearly polarized light from its display surface.

Also, although the present embodiment describes a case, where the invention is applied to gamma correction, the invention is applicable to any case provided that adjustment is required based on the screen light and/or the reflected light.

(5. Disclosure as Another Invention)

Part of the device or the method disclosed in the present specification may be understood as a device or a method described below.

5.1) Simple Gamma Correction Screen Light Computation Device

Based on the embodiment shown in FIG. 2, there may be understood another invention for detecting only the screen light by focusing on the second polarizing filter 83 and the screen light sensor 85. Specifically, the screen light sensor 85 has the light-receiving surface provided to form Brewster's angle for not receiving the P waves, and also has the polarizing filter provided in a direction for not receiving the S waves. Due to the above, a single sensor is capable of detecting the screen light.

In the above case, although the leakage P waves may be detected together, it is possible to highly accurately perform gamma correction with a simple configuration in an environment, where reflected light is not strong.

5.2) Reflected Light Detection Device

In addition, based on the embodiment shown in FIG. 2, there may be understood another invention for detecting only the S waves by focusing on the first polarizing filter 93 and the reflected light sensor 95. In the above case, it is possible to adjust the luminance based on the reflected light although the screen light is not considered for the adjustment. It is possible to adjust not only the luminance but also the chromaticity of display images, by employing a sensor capable of separately detecting an R component, a G component, and a B component.

Alternatively, the sensor may detect the P waves instead of the S waves. In other words, the reflected light sensor may receive the S waves or the P waves of the reflected light, and entire reflected light may be estimated based on the received value.

In the above case, the invention below may be understood.

A reflected light detection device includes a first sensor that is provided, at a predetermined angle, to face a display screen of a monitor that emits screen light linearly polarized in a first direction, the first sensor detecting ambient light reflected by the display screen of the monitor; a first polarizing filter that is provided to a light-receiving surface of the first sensor, the first polarizing filter having a polarizing direction perpendicular to the polarizing direction of the screen light which has been polarized; and a computation means for computing a total amount of ambient light, which is reflected by the display screen of the monitor, based on the detection value by the first sensor.

Note that, when the invention is implemented as the above reflected light detection device, the screen light measurement image display region 124 is not required to be set, and the measurement point 123 may be set at any position on the display surface of the liquid crystal panel 108 provided that the detector 105 is capable of measuring light.

5.3) Screen Light Computation Device Performing Measurement Synchronously with ON and OFF of PWM In the above embodiment, measurement is made for a period at least longer than one cycle of PWM control (ON-time and OFF-time) without turning off the backlight in order to detect the screen light. However, it is possible to obtain only the screen light without actively turning off the light by using the difference of measurement values between ON-time and OFF-time of the PWM control. In the above, values of the screen light and the reflected light (all or part of the reflected light, combination of the S waves, the P waves, or the leakage P waves of the reflected light) are detected during the ON-time. In contrast, the value obtained by removing the influence of the screen light from the value detected during the ON-time is detected during the OFF-time. Thus, it is possible to obtain the value for the screen light by computing the difference between the measurement value during the OFF-time and the measurement value during the ON-time.

In the above case, the invention below is understood.

A screen light computation device that is mounted to a monitor, which emits screen light linearly polarized in a first direction, and which includes a backlight control means for PWM-controlling a backlight, includes a first sensor that is provided to face a display screen of the monitor at a predetermined angle, the first sensor detecting the screen light; and a computation means for computing a difference between detection values by the first sensor during an ON-time and an OFF-time of the backlight.

In the above case, the first sensor may alternatively have a polarizing filter in front thereof, which has a polarizing direction in parallel with the polarizing direction of the screen.

Furthermore, the light-receiving surface of the first sensor may be provided to form Brewster's angle relative to the display screen of the monitor.

The invention claimed is:

1. A screen light computation device comprising:
   a screen light detection sensor that is positioned to face, at a predetermined angle, a display screen of a monitor, which emits screen light linearly polarized in a first direction, the screen light detection sensor detecting the screen light;
   a reflected light detection sensor that has a light-receiving surface provided on a plane substantially same with a plane of a light-receiving surface of the screen light detection sensor, the reflected light detection sensor detecting ambient light reflected by the display screen of the monitor;
   a first polarizing filter that is provided on a front side of the reflected light detection sensor, the first polarizing filter having a polarizing direction perpendicular to the polarizing direction of the screen light which has been linearly-polarized; and
   a computation means for computing a value of the screen light included in a detection value by the screen light detection sensor on the basis of both the detection value by the reflected light detection sensor and the detection value by the screen light detection sensor.

2. The screen light computation device according to claim 1, further comprising:
   a second polarizing filter that is provided on a front side of the screen light detection sensor, the second polarizing filter having a polarizing direction perpendicular to the polarizing direction of the first polarizing filter.

3. The screen light computation device according to claim 1, wherein:
   the first polarizing filter is provided at a position for blocking P waves and for allowing S waves to pass therethrough.

4. The screen light computation device according to claim 1, wherein:
   the first polarizing filter is provided at a position for blocking S waves and for allowing P waves to pass therethrough.

5. The screen light computation device according to claim 1, wherein:
   the predetermined angle corresponds to Brewster's angle formed by the light-receiving surface of the screen light detection sensor and the display screen of the monitor.

6. The screen light computation device according to claim 1, wherein:
   the screen light detection sensor and the reflected light detection sensor are swingably attached to the monitor to switch between a position within front space of an image display region on the monitor and another position retracted from the front space.

7. A gamma correction processing device comprising:
   the screen light computation device according to claim 1, and
   a gamma correction means for performing gamma correction of the monitor on the basis of the screen light computed by the screen light computation device.

8. A method for computing screen light comprising steps of providing a screen light detection sensor, at a predetermined angle, to face a display screen of a monitor, which emits screen light linearly polarized in a first direction, the screen light detection sensor detecting the screen light;

providing a reflected light detection sensor that has a light-receiving surface provided on a plane substantially same with a plane of a light-receiving surface of the screen light detection sensor, the reflected light detection sensor detecting ambient light reflected by the display screen of the monitor;

providing a first polarizing filter that is provided on a front side of the reflected light detection sensor, the first polarizing filter having a polarizing direction perpendicular to the polarizing direction of the screen light which has been linearly-polarized; and computing a value of the screen light included in a detection value by the screen light detection sensor on the basis of both the detection value by the reflected light detection sensor and the detection value by the screen light detection sensor.

9. A monitor mounted with the screen light computation device according to claim 1, wherein:

the screen light detection sensor and the reflected light detection sensor are provided within a frame member located around an image display region on the monitor to face the image display region.

10. A screen light detection device comprising:

a screen light detection sensor that is positioned to face, at a predetermined angle, a display screen of a monitor, which emits screen light linearly polarized in a first direction, the screen light detection sensor detecting the screen light; and a polarizing filter that is provided on a front side of the screen light detection sensor, the polarizing filter having a polarizing direction in parallel with that of the screen light, wherein:

the polarizing filter prevents, from entering into the screen light detection sensor, reflected light being ambient light reflected by a display screen of a monitor and having a polarizing direction perpendicular to that of the screen light.

11. A screen light detection device according to claim 10, wherein:

the polarizing filter is provided, with respect to the monitor, at a position for blocking S waves and for allowing P waves to pass therethrough.

12. A screen light detection device according to claim 11, wherein:

the predetermined angle corresponds to Brewster's angle formed by the light-receiving surface of the screen light detection sensor and the display screen of the monitor.

13. A screen light detection device according to claim 10, wherein:

the screen light detection sensor is swingably attached to the monitor to switch between a position within front space of an image display region on the monitor and another position retracted from the front space.

14. A screen light detection device according to claim 10, wherein:

the screen light detection sensor is provided within a frame member located around an image display region on the monitor to face the image display region.

* * * * *